3,412,194
GLASS-MELTING ELECTRODES FOR
GLASS-MELTING FURNACES
Egon Pipitz, Gerolf Strohmeier, and Karl Sedlatschek,
Reutte, Tyrol, Austria, assignors to Schwarzkopf Development Company, New York, N.Y., a corporation of New York
No Drawing. Filed Nov. 19, 1965, Ser. No. 508,775
Claims priority, application Austria, Nov. 20, 1964,
9,849/64; Nov. 30, 1964, 10,069/64; Dec. 7,
1964, 10,332/64; Dec. 10, 1964, 10,493/64
6 Claims. (Cl. 13—6)

ABSTRACT OF THE DISCLOSURE

Glass-melting electrodes for glass-melting furnaces combine 80 to 15 vol. percent of a ceramic phase with the balance 20 to 85 vol. percent of a metal phase consisting either of molybdenum or tungsten or a tungsten-molybdenum alloy. The ceramic phase is selected from the group of ceramics consisting of zirconium oxide containing 4 to 10 wt. percent calcium oxide, zirconium oxide containing 4 to 10 wt. percent magnesium oxide, such zirconium oxide ceramics containing up to 50 wt. percent thorium oxide, such zirconium oxide ceramics containing up to 50 wt. percent titanium oxide and combinations of two and more of said ceramics. Extremely good results are obtained with the specified metal phase combined with 25 to 60 vol. percent of a ceramic phase consisting of the zirconium oxide containing 4 to 10 wt. percent magnesium oxide or calcium oxide as the balance of the body.

---

This invention relates to glass-melting electrodes for glass-melting furnaces, and other critical parts of glass-melting furnaces. Heretofore ceramic materials have been used in such apparatus or vessels so exposed to molten glass. However the known or used molten-glass-exposed ceramic bodies do not have sufficient resistance in withstanding corrosion by discharging or streaming molten glass. Thus when such ceramic materials are exposed to discharging or streaming molten glass, some of their ceramic elements dissolve in the molten glass stream and contaminate the glass.

Some ceramic oxide bodies, for example, of aluminum oxide or zirconium oxide have the required higher corrosion and oxidation resistance to molten glass, and are often used for parts which are subjected to strong erosion and/or corrosion by streaming molten glass. As example, such strong erosion takes place along the regions of the glass melting furnace which are at the level of the molten glass and along the openings through which the molten glass is discharged. However, such ceramic oxide bodies and the other ceramic bodies are deficient because they do not withstand sudden thermal shocks and thermal strains in applications where they are exposed to discharged or streaming molten glass.

Metallic bodies are not materially affected by such thermal shocks. Thus platinum and platinum alloys have proven satisfactory for such applications in glass melting furnaces and related equipment. However, platinum is very expensive. Molybdenum has been found satisfactory in resisting corrosion by molten streaming glass. However, molybdenum readily oxides within an oxidizing atmosphere, such as air, at elevated temperatures of molten glass, and can only be used for structures which are surrounded on all sides by molten glass.

Among the objects of the invention are shaped strong solid bodies which resist corrosion when exposed to streaming molten glass in presence of oxidizing media but are free of the deficiencies and limitations described above.

In accordance with the invention, shaped and hard homogeneous composite solid sintered powder bodies combining 85 to 20 vol. percent of a metal phase selected from molybdenum, tungsten or their alloys with 15 to 80 vol. percent (volume percent) of a zirconium oxide ceramic phase, which is stabilized by an addition of 4 to 10 wt. percent of its weight consisting of either magnesium oxide or calcium oxide or of both of these additional oxides, have a long useful life when exposed in an oxidizing atmosphere to streaming or discharging molten glass. For best results, such composite shaped hard sintered powder bodies should contain 25 to 60 vol. percent of such ceramic phase and 75 to 40 vol. percent of such metal phase. The zirconium oxide (zirconia) phase may contain up to 50 wt. percent of its own weight of thorium oxide (thoria), hafnium oxide (hafnia) or titanium oxide (titania).

In many cases when the surface of such combined ceramic-metal-phase bodies of the invention are subjected to heating by molten glass in air or similar oxidizing media, its oxidation resistance is often not sufficient. In accordance with the invention, this limitation is overcome and their oxidation resistance is greatly increased by enclosing the surfaces of such ceramic-metal-phase bodies with silicon containing protective layer. The adhesion of the silicon protective layer is materially increased by removing the metal content from the underlying surface layer of such ceramic-metal-phase bodies and forming thereby a ceramic zirconium oxide skeleton layer to which the silicon containing oxidation suppressing surface layer is firmly anchored or which is combined with deposited silicon into the desired silicon or silicide protective layer.

The foregoing and other features of the invention will be more fully understood from the following description of exemplifications thereof, reference being made to the accompanying drawings wherein:

The single figure is a cross-sectional view of the end section of a rod-shaped glass-melting electrode made with the above-specified compositions of the invention.

Reference is made to the above described shaped hard ceramic-metal-phase bodies of the invention which resist corrosion and oxidation when exposed to erosive action of streaming molten glass in air or a similar oxidizing medium. As an example, there will be described the process of forming a shaped hard glass-melting electrode of the invention which is used for melting glass in a glass melting furnace.

A intimate or thorough mixture of fine powder particles consisting of 40 vol. percent (volume percent) molybdenum powder, 20 vol. percent tungsten powder, 36 vol. percent zirconium oxide powder and 4 vol. percent of magnesium oxide powder is hydrostatically compressed into cylindrical rods 6 cm. (centimeters) in diameter. The rod compacts are sintered for one hour at 2000° C. in a hydrogen and thereafter cooled in a similar atmosphere, yielding rods approaching theoretical density. By machining with cutting tools, the sintered rods are given the desired final shape. Silicon tetrachloride gas decomposes at and above 1200° C. and the silicon of the decomposition is deposited on underlying or contacting body. The shaped sintered rod is then heated in a gas mixture of silicon tetrachloride and hydrogen at elevated temperatures to cause liberation and deposition of silicon from the gas mixture on the exposed rod surface and the diffusion and alloying of a material proportion of the deposited silicone in the underlying body layer to form therewith a firmly adhering continuous silicon-containing or silicide layer which exhibits high oxidation and corrosion resistance when exposed to molten glass in an oxidizing atmosphere. The so obtained electrodes are then mounted in the glass-melting furnace and used for melting the glass. The oxidation suppressing effectiveness of the silicon containing protective layer is so great that even before these electrodes are covered by molten glass they are kept operating for a substantial time without detection of disturbing oxidation of their siliconized surface layers.

For further investigation of their corrosion and oxidation resistance, there have been prepared by a similar procedure similar rod shaped electrode samples, 106 by 9 by 9 mm. (millimeter) in diamensions, consisting of of 40 vol. percent molybdenum, 54 vol. percent zirconium oxide and 6 vol. percent magnesium oxide. After heating such sample rod, without the silicon containing protective layer, in air at 970° F. for 8 (eight) hours its oxidation loss of evaporated molybdenum oxide was only 75 milligram per square centimeter of the rod surface. A similar other rod was held immersed in molten glass (of the window-type) for four hours without any corrosion or oxidation loss.

Any of the other known processes may be used for forming on the exposed surfaces of the above specified ceramic-phase and metal-phase hard bodies of the invention the desired silicon containing protective layer. As an example, the composite shaped body of the invention is immersed in a molten body of a silicon-base alloy to cause the silicon of the molten alloy both to combine and diffuse into the surface layer of the composite body of and form thereof an adhering oxidation suppressing protective silicon-base exposed body layer.

Alternatively, the composite shaped body is enclosed within a packing of silicon powder and heated within hydrogen at a high temperature to cause diffusion and combination of the silicon with the exterior layer particles of the composite body and form thereof an adhering oxidation suppressing silicon-base body layer.

Alternatively, the composite body is covered with a powder layer containing molybdenum disilicide powder with a suitable binder medium and heated in an atmosphere to form on the exterior of the treated body a similar silicon-base oxidation suppressing protective layer. The adhesion of such oxidation suppressing protective body surface layer to the interior shaped body of the invention is materially increased by first removing from the exterior layer of the described shaped composite body its metal ingredients. Such metal-phase removal may be secured by treating the so exposed surface of such composite body with nitrohydrochloric acid (aqua regia) which dissolves the exposed layer metal content and forms thereof a ceramic zirconium oxide layer structure which is firmly anchored to the underlying solid sintered composite body. The so formed exposed ceramic zirconium oxide layer is free from metallic ingredients and will combine with the silicon into an adhering silicon or silicon-base exterior body layer resisting oxidation and corrosion by molten glass in presence of an oxidizing atmosphere.

To form such composite hard shaped body of the invention, an intimate mixture of fine powder particles of its ingredients is compacted and sintered, for example, 1 hour in hydrogen, and thereafter cooled in such atmosphere. The so sintered body is then machined in a conventional manner to the final shaped where desired.

The so obtained shaped composite ceramic and metal-phase bodies exhibit excellent corrosion resistance when subjected to discharging or streaming molten glass. Because of their high corrosion resistance against streaming molten glass, such shaped composite bodies of the invention are also excellent as lining or cladding for glass melting furnaces, for streaming molten glass holding or guiding vessels or crucibles and like devices which are exposed to streaming molten glass. Because of their high corrosion resistance to molten glass, such sintered shaped composite ceramic and metal-phase bodies are also of great value for use in all objects which are exposed to molten glass, such as molten glass stirrers, protective enclosures for thermocouples held in molten glass, glass-melting electrodes and like devices which are in contact with molten glass.

The surfaces of such sintered ceramic and metal-phase bodies which are exposed to molten glass and also to air or similar oxidizing atmospheres, are enclosed with or has tightly affixed thereto a silicon containing oxidation suppressing protective surface layer as described above.

The principles underlying the invention described in connection with specific exemplifications will suggest other modifications and applications thereof. It is accordingly desired that the appended claims shall not be limited to specific examples shown or described herein.

We claim:

1. A shaped hard glass-melting electrode to be held in contact with molten glass in a glass-melting furnace, said electrode body having high resistance to corrosion and high temperature strength under exposure to molten corrosive glass and consisting of a ceramic phase and a metal phase, said ceramic phase constituting 80 to 15 vol. percent of said body and consisting essentially of a ceramic selected from the group consisting of zirconium oxide containing 4 to 10 wt. percent calcium oxide, zirconium oxide containing 4 to 10 wt. percent magnesium oxide, such zirconium oxide ceramics containing up to 50 wt. percent thorium oxide, such zirconium oxide ceramics containing up to 50 wt. percent titanium oxide and combinations of two and more of said ceramics, said metallic phase constituting 20 to 85 vol. percent of and being the balance of said body and consisting essentially of metal selected from the group consisting of molybdenum, tungsten and alloys of said two metals, said electrode body consisting of a homogenous mixture of fine powder particles of said specified ceramic and metal phase ingredients, which particles have been compacted and have been sintered at temperatures of at least 1800° C. into a body having a high density near the theoretical density of its composition and resisting corrosion and oxidation by molten glass at high temperatures of molten glass held in contact therewith.

2. A shaped glass-melting electrode body as claimed in claim 1 having an exterior body layer held in contact with molten glass in presence of an oxidizing medium, said exterior body layer containing silicon and exhibiting materially higher oxidation resistance to said oxidizing medium than more interior portions of said electrode body.

3. A shaped hard glass-melting electrode body to be held in contact with molden glass in a glass-melting furnace, said electrode body being of homogenous composition and, having high temperature strength and resistance to corrosion by molten glass when held immersed by molten glass and consisting of a ceramic phase and a metal phase, said ceramic phase constituting 60 to 25 vol. percent of said body and consisting of a ceramic selected from the group consisting of zirconium oxide containing 4 to 10 wt. percent magnesium oxide, and combinations of two and more of said ceramics, said metallic phase constituting 40 to 75 vol. percent of and being the balance of said body and consisting of metal selected from the group consisting of molybdenum, tungsten, and molybdenum tungsten alloys.

said body consisting of a homogenous mixture of fine powder particles of said specified ceramic and metal phase ingredients, which particles have been compacted and have ben sintered at temperatures of at least 1800° C. into a body having a high density near the theoretical density of its composition and resisting corrosion by molten glass held in contact therewith.

4. A shaped glass-melting electrode body as claimed in claim 3 having an exterior body layer held in contact with molten glass in presence of an oxidizing medium, said exposed body layer containing silicon and exhibiting materially higher oxidation resistance to said oxidizing medium than more interior portions of said body.

5. A shaped glass-melting electrode body as claimed in claim 1 having an exterior body layer held in contact with molten glass in presence of an oxidizing medium, said exterior body layer being free of said metallic phase and containing silicon and exhibiting materially higher oxidation resistance to said oxidizing than more interior portions of said body.

6. A shaped glass-melting electrode body as claimed in claim 3 having an exterior body layer held in contact with molten glass in presence of an oxidizing medium, said exterior body layer being free of said metallic phase and containing silicon and exhibiting materially higher oxidation resistance to said medium than more interior portions of said body.

References Cited

UNITED STATES PATENTS

| | | | |
|---|---|---|---|
| 2,189,387 | 2/1940 | Wissler | 264—10 |
| 2,209,515 | 7/1940 | Ehman et al. | 13—6 |
| 2,767,235 | 10/1956 | Herrold et al. | 13—6 |
| 2,276,295 | 3/1942 | Ferguson | 13—6 |
| 2,940,951 | 6/1960 | Ruskin | 75—84 X |
| 3,079,452 | 2/1963 | Copin | 106—57 |
| 3,119,717 | 1/1964 | Veres | 106—57 |
| 3,125,441 | 3/1964 | Lafferty et al. | 75—84 X |
| 3,309,209 | 3/1967 | Martinet | 106—57 |

BERNARD A. GILHEANY, *Primary Examiner.*

H. B. GILSON, *Assistant Examiner.*